(12) United States Patent
Doerr et al.

(10) Patent No.: US 12,084,073 B2
(45) Date of Patent: Sep. 10, 2024

(54) METHOD AND DEVICE FOR OPTIMUM PARAMETERIZATION OF A DRIVING DYNAMICS CONTROL SYSTEM FOR VEHICLES

(71) Applicant: Robert Bosch GmbH, Stuttgart (DE)

(72) Inventors: Andreas Doerr, Stuttgart (DE); Felix Berkenkamp, Munich (DE); Maksym Lefarov, Stuttgart (DE); Valentin Loeffelmann, Dielheim (DE)

(73) Assignee: Robert Bosch GmbH, Stuttgart (DE)

( * ) Notice: Subject to any disclaimer, the term of this patent is extended or adjusted under 35 U.S.C. 154(b) by 268 days.

(21) Appl. No.: 17/809,587

(22) Filed: Jun. 29, 2022

(65) Prior Publication Data

US 2023/0001940 A1 Jan. 5, 2023

(30) Foreign Application Priority Data

Jun. 30, 2021 (DE) ...................... 10 2021 206 880.4

(51) Int. Cl.
*B60W 50/08* (2020.01)
*B60W 30/18* (2012.01)
*B60W 50/12* (2012.01)

(52) U.S. Cl.
CPC .... *B60W 50/085* (2013.01); *B60W 30/18109* (2013.01); *B60W 50/12* (2013.01); *B60W 2510/182* (2013.01); *B60W 2520/26* (2013.01)

(58) Field of Classification Search
CPC ......... B60W 50/085; B60W 30/18109; B60W 50/12; B60W 2510/26; B60W 2050/0006;
(Continued)

(56) References Cited

U.S. PATENT DOCUMENTS 6,216,068 B1 * 4/2001 Gimmler ............... B60W 10/06
701/51
7,696,863 B2 * 4/2010 Lucas .................... B60Q 9/008
340/435
(Continued)

FOREIGN PATENT DOCUMENTS

DE 100 03 739 A1 8/2001
DE 10 2006 054 425 A1 5/2007
(Continued)

*Primary Examiner* — Mussa A Shaawat
(74) *Attorney, Agent, or Firm* — Maginot, Moore & Beck LLP (57) ABSTRACT

A method and device parameterize a driving dynamics controller of a vehicle, which intervenes in a controlling manner in a driving dynamics of the vehicle. The driving dynamics controller ascertains an action depending on a vehicle state. The method includes providing a model for predicting a vehicle state. The model configured to predict a subsequent vehicle state depending on the vehicle state and the action. At least one data tuple is ascertained including a sequence of vehicle states and respectively associated actions. The vehicle states are ascertained by the driving dynamics controller using the model depending on an ascertained action. The parameters of the driving dynamics controller are changed/adjusted such that a cost function which ascertains costs of the trajectory depending on the vehicle states and on the ascertained actions of the respectively associated vehicle states and is dependent on the parameters of the driving dynamics controller is minimized.

17 Claims, 3 Drawing Sheets

(58) Field of Classification Search
CPC ..... B60W 50/0098; B60W 2050/0031; B60W 2050/0082; B60W 40/10; B60W 30/02; G06N 3/094; G06N 3/0442; G06N 7/01; G06N 3/084; G06N 3/092

See application file for complete search history.

(56) References Cited

U.S. PATENT DOCUMENTS

| | | | | |
|---|---|---|---|---|
| 9,605,971 | B2* | 3/2017 | Niehsen | B60K 35/00 |
| 10,914,221 | B2* | 2/2021 | Hasslacher | F01N 11/00 |
| 11,361,598 | B2* | 6/2022 | Koller | B60L 58/10 |
| 11,644,515 | B2* | 5/2023 | Kupcsik | B60L 58/16 |
| | | | | 702/63 |
| 11,656,293 | B2* | 5/2023 | Huelsing | G01R 31/3828 |
| | | | | 324/426 |
| 11,858,511 | B2* | 1/2024 | Trachte | G06N 20/00 |
| 2007/0106475 | A1* | 5/2007 | Kondoh | B60K 26/021 |
| | | | | 340/436 |
| 2008/0055114 | A1* | 3/2008 | Kim | G06V 20/56 |
| | | | | 701/1 |
| 2013/0262067 | A1* | 10/2013 | Zhang | G05B 23/024 |
| | | | | 703/8 |
| 2014/0176350 | A1* | 6/2014 | Niehsen | G06V 20/58 |
| | | | | 340/988 |
| 2015/0105904 | A1* | 4/2015 | Mou | B60L 15/2036 |
| | | | | 901/1 |
| 2015/0105936 | A1* | 4/2015 | Grinenval | B60W 10/06 |
| | | | | 701/1 |
| 2015/0298680 | A1* | 10/2015 | Matthews | B60W 10/08 |
| | | | | 180/65.265 |
| 2016/0107688 | A1* | 4/2016 | Schwarzkopf | G01C 21/3878 |
| | | | | 701/41 |
| 2017/0057510 | A1* | 3/2017 | Herbach | B60W 30/181 |
| 2018/0148061 | A1* | 5/2018 | Reckziegel | B60W 50/14 |
| 2020/0331473 | A1* | 10/2020 | Schiegg | B60W 40/09 |
| 2021/0114593 | A1* | 4/2021 | Trachte | G06N 20/00 |
| 2021/0188297 | A1* | 6/2021 | Wray | B60W 50/0098 |
| 2022/0099752 | A1* | 3/2022 | Simonis | G01R 31/3648 |
| 2023/0034418 | A1* | 2/2023 | Busse | B60W 20/12 |
| 2023/0286546 | A1* | 9/2023 | Moradipari | G05B 13/0265 |
| 2023/0311849 | A1* | 10/2023 | Raste | B60W 10/04 |
| | | | | 701/22 |
| 2024/0045425 | A1* | 2/2024 | El Assaad | G05D 1/0022 |

FOREIGN PATENT DOCUMENTS

| | | |
|---|---|---|
| DE | 10 2016 214 064 A1 | 2/2018 |
| DE | 10 2019 127 906 A1 | 4/2021 |

* cited by examiner

METHOD AND DEVICE FOR OPTIMUM PARAMETERIZATION OF A DRIVING DYNAMICS CONTROL SYSTEM FOR VEHICLES

This application claims priority under 35 U.S.C. § 119 to patent application no. DE 10 2021 206 880.4, filed on Jun. 30, 2021 in Germany, the disclosure of which is incorporated herein by reference in its entirety.

The disclosure relates to a method for optimum parameterization of a driving dynamics controller of a vehicle, to a training device, to a computer program and to a machine-readable storage medium.

BACKGROUND

Driving dynamics controllers are generally known from the prior art. The term driving dynamics controller (or electronic stability controller, ESC) denotes a controller for any vehicles which in particular situations, for example in which tire adhesion on the road surface is no longer optimal, intervenes in a controlling manner in the driving operation of the vehicle in order to achieve optimal tire adhesion again, for example. These particular situations can be perceived by virtue of the fact that an anomaly arises in the event of continuous monitoring of the tire adhesion or another vehicle state, for example.

For example, the driving dynamics controller can counteract swerving of the vehicle through targeted braking of individual wheels, for example, in order to prevent the vehicle from skidding in the border area on bends when driving on bends as well as in the case of oversteering or understeering through targeted braking of individual wheels in order to thus ensure the driver has control over the vehicle. Another application of driving dynamics control systems is, for example, providing an optimum brake pressure in the case of an emergency brake in order to counteract blocking of the wheels and to keep the braking distance as short as possible.

When the brake system is adapted to a particular vehicle type, a multiplicity of parameters have to be set in a manner specific to the vehicle type during the application. This is therefore complex and does not always lead to optimum settings.

It is an object of the disclosure to provide an efficient and automated method for the optimum parameterization of a driving dynamics controller.

SUMMARY

The disclosure has the advantage that it is possible to find parameterizations which achieve significantly more optimized control, in particular tire adhesion, compared to the previous parameterizations. For example, it is possible to show that the braking distance in the event of an emergency brake can be significantly shortened again compared to current emergency brake systems. This increases the safety of the occupants of the vehicle.

The disclosure also has the advantage that the optimum parameterization can be found in automated fashion, as a result of which complex manual testing and evaluation becomes obsolete.

The disclosure also has the advantage that the parameterization can even be learned exclusively through simulations of the vehicle. This is particularly advantageous since, in simulations, the limits of the driving dynamics can be pushed further, as a result of which on the one hand more parameterizations can be tested and on the other hand they can be tested more cost-effectively. It is therefore possible to say that a particularly efficient and effective application can be achieved thereby.

The disclosure also has the advantage that minimum intervention can be performed by the application engineer through domain knowledge (such as, for example, through high-level decisions: more comfort vs. more performance) and therefore the parameterization is also able to be adjusted to customer requirements in a targeted manner.

The disclosure also has the advantage that a higher degree of robustness, that is to say a good performance, can be achieved at all operating points and thus not only in a manner optimized for individual test scenarios.

In a first aspect, the disclosure relates to a method, which is implemented in particular by computer, for the optimum parameterization of a driving dynamics controller of a vehicle. The driving dynamics controller can intervene in a controlling manner in driving dynamics of the vehicle, or can control the driving dynamics, wherein the driving dynamics controller ascertains an action ($a_t$) depending on an, in particular current, vehicle state ($s_t$) in order, for example, to positively intervene in the driving dynamics. There is thus intervention in the driving dynamics in order to keep the vehicle stable on its original driving trajectory.

The driving dynamics can be understood to include movements of the vehicle, that is to say routes, speeds, accelerations and the forces and torques acting on the vehicle in and around the three directions of vehicle movement. The vehicle movements comprise, for example, journeys ahead and on bends, vertical, pitching and rolling movements as well as travel at a constant speed, braking and acceleration processes. Vibrations of the vehicle can also be understood here as driving dynamics.

The vehicle state ($s_t$) can be understood to include a variable that characterizes a state of the vehicle with respect to the driving dynamics thereof and/or with respect to a state of a component of the vehicle. The vehicle state preferably characterizes a part of the current vehicle dynamics, in particular a physical movement of the vehicle. Conceivable physical movements are the three translational movements in the direction of the main axes, namely the longitudinal movement along a longitudinal axis, the actual change in location, the transverse movement along a transverse axis, and a stroke movement along a vertical axis, generally combined with the longitudinal movement when driving downhill or uphill. The physical movements can also be given as accelerations. Rotary movements about the three main axes, for example yawing about the vertical axis, pitching about the transverse axis and rolling about the longitudinal axis are also conceivable. These movements can be given as angles or angular speeds. Additional translation and rotation oscillation can also be included in the vehicle state.

Furthermore, the vehicle state preferably characterizes a steering wheel angle or a steering wheel torque. The vehicle state particularly preferably also characterizes tire adhesion and/or a behavior of the tire.

The action ($a_t$) can be understood to include a variable that characterizes a movement of the vehicle, that is to say when the action is performed by the vehicle, the vehicle performs said movement. The action ($a_t$) is preferably a control variable, such as, for example, a braking force or even a braking pressure.

The method comprises the steps explained below. The method begins with providing a model P for predicting a vehicle state ($s_{t+1}$). The model P is configured to this end to predict a subsequent vehicle state ($s_{t+1}$) depending on the vehicle state ($s_t$) and the action ($a_t$). The subsequent vehicle state ($s_{t+1}$) can be understood to include the vehicle state that arises immediately when the action ($a_t$) has been performed by the vehicle from the current vehicle state ($s_t$).

This is followed by ascertaining at least one data tuple ($s_0, \ldots, s_t, \ldots s_T; a_0, \ldots, a_t, \ldots a_T$) comprising a sequence of vehicle states ($s_0, \ldots, s_t, \ldots s_T$) and respectively associated actions ($a_0, \ldots, a_t, \ldots a_T$), wherein the vehicle states are ascertained by the driving dynamics controller by means of the model (P) depending on an ascertained action.

This is followed by adjusting the parameters ($\theta$) of the driving dynamics controller in such a way that a cost function (c) which ascertains costs of the recorded trajectory depending on the vehicle states of the data tuple and on the ascertained actions of the respectively associated vehicle states and is dependent on the parameters of the driving dynamics controller is minimized. The parameters ($\theta$) of the driving dynamics controller can be adjusted for each vehicle state of the data tuple or over an entire sequence from the data tuple.

The parameters ($\theta$) can be adjusted by an optimization algorithm, preferably by means of a gradient descent method, particularly preferably by means of back propagation through time.

It has been identified that a so-called model-based approach to optimizing the driving dynamics controller based on the optimization by means of the relatively accurate model can determine the most information-rich adjustment of the parameters $\theta$. As an alternative thereto, there are so-called model-free approaches but these are less expedient because they do not provide sufficient information in the optimization of the parameters to obtain a driving dynamics controller that controls the driving dynamics as best as possible. It is therefore possible to say that driving dynamics controllers that have a significantly better performance than manually set controllers can be provided only by way of the proposed method. Compared to other learning paradigms, this approach has the advantage that it is scalable, that is to say it is possible to deal with arbitrarily complex amounts of data, and that it can also optimize high-dimensional driving dynamics controllers.

It is proposed that the model (P) is a trainable mode, the parameterization of which has been learned depending on detected driving maneuvers of the vehicle or another vehicle, or the model (P) is a physical model which describes driving dynamics of the vehicle, in particular along a longitudinal and a lateral axis of vehicles. The trainable model may be, for example, a machine learning system, preferably a neural network. In general, the trainable model may be a black box model, for example linear or feature-based regression, Gaussian process models, recurrent neural networks (RNNs, LSTMs), (deep) neural networks or a white box model, for example (simplified) physical models with parameters or combinations thereof (gray box model).

The physical model has the advantage that it enables analytical gradients, as a result of which more precise adjustments are achieved, which leads to the driving dynamics controller parameterization being closer to an ideal parameterization. Furthermore, no real measurements are required, for which reason the method can advantageously be carried out purely simulatively.

It is furthermore proposed that a trajectory of a real driving maneuver of the vehicle is also detected, wherein a correction model (g) is created depending on the detected trajectory and the model (P), such that the correction model (g) corrects outputs of the model (P) in such a way that they substantially correspond to the detected trajectory. The trajectory may describe a sequence of vehicle states and the action of the real driving maneuver selected in the respective vehicle state. "Substantially" can be understood to mean here that an accuracy achieved by this correction is within measurement tolerances for said vehicle states to be corrected or within the accuracy that can be achieved using the respective optimization methods for creating the correction model or a maximum achievable accuracy of the correction model through a cardinality of the correction model.

It is conceivable that this additional step of detecting the real driving maneuver takes place once more after the step of adjusting the parameters of the driving dynamics controller, with the real driving maneuver now being carried out using the adjusted driving dynamics controller. The trajectory thus detected can then be used again in order to readjust the correction model and also to readjust the further steps of the ascertainment, of at least one data tuple, by means of the model P and subsequently to adjust the parameters of the driving dynamics controller.

In particular, the correction model is created in such a way that a difference between the output of the correction model and the difference between the recorded state of the training data and the state predicted by the model is minimized.

When the model (P) is a learned model, the parameterization thereof can be learned in respect of the detected trajectory. For example, an optimization of the model parameters by means of calculating the maximum likelihood or maximum a-posteriori solution for single-step or multiple-step model predictions in an open (feedforward) or closed (feedback) control circuit, for example by means of (stochastic) gradient descent, is suitable for this.

The use of the correction model surprisingly achieves the advantage that particularly few real maneuvers of the vehicle are required in order to optimize the driving dynamics controller on the one hand and to create the learned model on the other hand.

It is also proposed that the model (P) is deterministic and the correction model is dependent on time. In other words, the correction model is dependent on the state or on a time, wherein the time characterizes a period of time that has elapsed since the beginning of the recorded trajectory. That is to say the correction model determines the correction value for the model P in a manner dependent on time. It has surprisingly been found that this type of correction model has led to the best parameterizations. The time may also be a discrete value that characterizes a number of actions carried out since a predefined starting point (for example time at which the driving dynamics controller intervenes in the driving dynamics).

The combination of the model P and the correction model, which is configured to correct outputs of the model, may be understood as a global model for predicting the change in state. In other words, the global model of the changes in state is a superposition of these two models.

The correction model is thus configured to correct errors in the first model in relation to the true state of the surroundings after an action has been carried out. For example, the model predicts a state depending on a current state and an action. It should be noted that the action can be determined by the driving dynamics controller as well as by a driver, for example. Subsequently, the correction model corrects the predicted state of the model such that the predicted state is as similar as possible to the actual state of the surroundings after the agent has carried out this action for the current state. In other words: the correction model corrects the output of the first model in order to obtain a forecast state that is as close as possible to the state that the surroundings would actually assume or to the state that has been detected during the maneuvers. The correction model therefore corrects the first model in order to obtain a more accurate state with respect to the surroundings, in particular the dynamics of the surroundings.

The correction model preferably depends either on a temporal step and/or the current state. As an alternative, the correction model is a correction term, which is an extracted correction value determined by the model by a difference between the detected vehicle states of the detected real maneuver and the predicted states. The correction model can output discrete corrections that can be added directly to the prediction of the model. A special case of the correction model in which the correction model outputs time-discrete correction values may be present.

Furthermore, it is proposed that the correction model is selected by virtue of a measure of the difference between the output of the correction model and the difference between the detected vehicle state along the trajectory and the predicted vehicle states of the model being minimized. This minimization can also be carried out by means of the known gradient descent method.

Furthermore, it is proposed that a plurality of different models (P) are provided, wherein the data tuple is detected randomly for one of the plurality of different models.

It is advantageous here that, on the one hand, uncertainties in the model can be modeled and finally a robust controller behavior can be achieved and therefore, for example, the controller can deal better with temporal changes. It is also conceivable that the model or the models can output an uncertainty with respect to their predictions, the uncertainty characterizing an uncertainty in their predictions, with this uncertainty been taken into account in the adjustment of the parameters of the driving dynamics controller. The uncertainty can be ascertained as follows: (1) statistical statements about the performance, robustness and reliability of the controller, and/or (2) prevention of uncertain/unknown vehicle behavior during/after optimization, and/or (3) acceleration of the learning through additional exploration in previously unknown regions.

Propagation of the (model) uncertainty over several temporal steps results in the uncertainty in the long-term predictions (a distribution over possible future system behavior). In this case, methods are, for example, analytically closed (for simple models, for example linear Gaussian), sampling, numerical integration, moment matching, linearization (for more complex models).

Furthermore, it is proposed that the different models differ from one another in that they each take into account or characterize different dynamics of external variables or different dynamics of variables of the vehicle.

An example of a dynamic variable is a changing road surface or different scenarios, such as a changing profile of the road with respect to all three possible spatial axes of the road.

Furthermore, it is proposed that a respective data tuple is detected for each of the models, wherein the parameters are changed depending on all of the data tuples. It has been found that this leads to a particularly optimal, robust controller behavior.

Furthermore, it is proposed that the detected vehicle states are filtered by means of a Kalman filter, wherein a parameterization of the Kalman filter is ascertained depending on a predicted trajectory of the vehicle, wherein the Kalman filter is applied to the detected states.

Furthermore, it is proposed that the driving dynamics controller has a modular controller structure, wherein, when the parameters are adjusted, they are adjusted in such a way that the changed parameters are within predefined value ranges. That is to say the controller is divided into modules and each module is responsible for a subfunction, for example a PID controller that controls the current slip with respect to the target slip. Another module would then be a gain scheduler that adjusts the PID gains according to driving situation, ground, speed. Another module can again estimate the driving situation based on the wheel speeds, brake pressure profile and vehicle speed, etc.

In addition to optimization of the parameters only within trusted ranges, the advantage is also that the driving dynamics controller will not exhibit safety-critical behavior and also that an exploration of the driving dynamics is limited to useful vehicle states.

Furthermore, it is proposed that the driving dynamics controller is a neural network, in particular a radial basis function network.

It is advantageous that neural networks can learn complex relationships very well and exhibit a particularly high degree of flexibility in order to learn a wide variety of controller behaviors. RBF networks are particularly preferred since these are particularly suitable for implementation on a control device in a vehicle on account of their compact design.

Furthermore, it is proposed that, after the parameters have been adjusted, a vehicle state is detected during operation of the vehicle, wherein an actuator of the vehicle is actuated depending on the action which by means of the driving dynamics controller depending on said detected vehicle state.

Furthermore, it is proposed that the cost function is a weighted superposition of a plurality of functions, wherein the functions characterize a difference between a current slip of tires of the vehicle and a target slip, a distance covered since the intervention of the driving dynamics controller, and temporal deviations in the distance covered.

Furthermore, it is proposed that the driving dynamics controller is an ABS controller and outputs an action which characterizes a braking force, wherein the physical model comprises a plurality of submodels which are a physical model of a component of the vehicle.

The action can be determined individually, for example, separately for each of the wheels or axles of the vehicle, with the result that the wheels/axles can be actuated individually depending on the respective brake pressure.

It should be noted that the driving dynamics controller may be, for example, an ABS, TCS or an ESP controller, etc., or a combination of these controllers.

It should also be noted that the method can also be used to readjust an already optimized driving dynamics controller for a first vehicle type/instance for a second vehicle type/instance or even to readjust it for the first vehicle type/instance, for example if the vehicle has been provided with new tires.

In further aspects, the disclosure relates to a device and to a computer program which are each configured to execute the above methods and to a machine-readable storage medium on which said computer program is stored.

BRIEF DESCRIPTION OF THE DRAWINGS

Embodiments of the disclosure are explained in more detail below with reference to the appended drawings. In the drawings.

DETAILED DESCRIPTION

Figure 1:
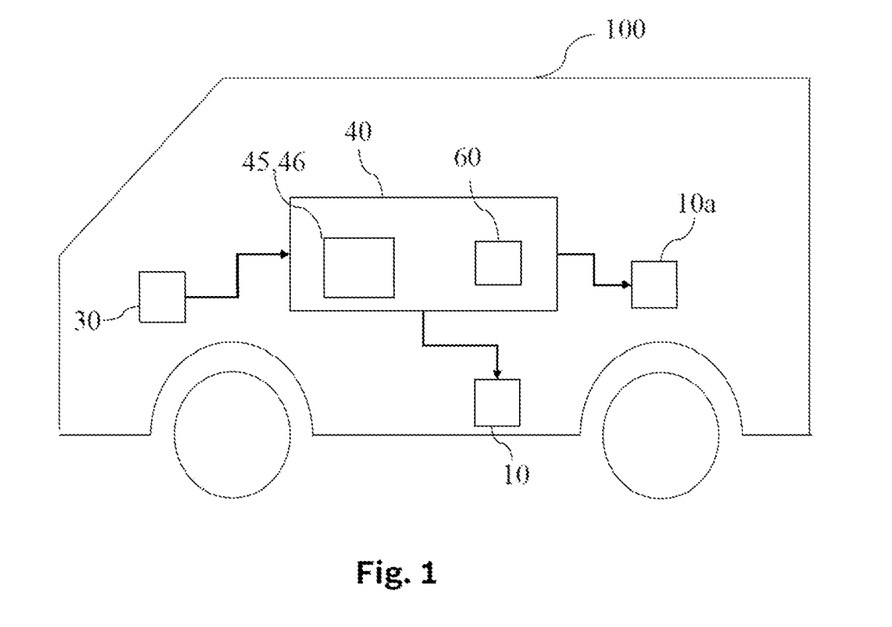
FIG. 1 schematically shows an exemplary embodiment for controlling a vehicle using a driving dynamics controller.

FIG. 1 shows by way of example a vehicle 100 comprising a control system 40.

The vehicle 100 may generally be a motor vehicle which is controlled by a driver or a partly autonomous or even fully autonomous vehicle. In other embodiments, the motor vehicle may be a wheeled vehicle, a track vehicle or a rail vehicle. It is also conceivable that the motor vehicle is a two-wheeled vehicle, such as a bicycle, motor bike etc., for example.

A state of the vehicle is detected at preferably regular time intervals using at least one sensor 30, which may also be provided by a plurality of sensors. The state may also be ascertained independently of detected sensor values. The sensor 30 is preferably an acceleration sensor (in the vehicle longitudinal direction, but could also be a 3D sensor in all axes), a wheel speed sensor (on all wheels), a rotation rate sensor about a vertical axis, but could also be about all other axes).

The control system 40 receives a sequence of sensor signals S from the sensor 30 in an optional reception unit which converts the sequence of sensor signals S into a sequence of preprocessed sensor signals.

The sequence of sensor signals S or preprocessed sensor signals is supplied to a vehicle dynamics controller 60 of the control system 40. The driving dynamics controller 60 is preferably parameterized by parameters θ which are stored in a parameter memory P and are provided by same.

The driving dynamics controller 60 ascertains an action, also referred to as control signal A in the following text, depending on the sensor signals S and the parameters θ thereof, said control signal being transmitted to an actuator 10 of the vehicle. The actuator 10 receives the actuation signals A, is actuated accordingly and subsequently executes the corresponding action. It is also conceivable that the actuator 10 is configured to convert the actuation signal A into a direct actuation signal. If, for example, the actuator 10 receives a brake force as actuation signal A, the actuator can convert said brake force into a corresponding brake pressure which is used to directly actuate brakes. In this case, the actuator 10 may be a brake system, comprising the brakes of the vehicle 100. In addition or as an alternative, the actuator 10 may be a drive or a steering system of the vehicle 100.

In further preferred embodiments, the control system 40 comprises one or a plurality of processors 45 and at least one machine-readable storage medium 46 on which instructions are stored, which, when they are executed on the processors 45, cause the control system 40 to execute the method according to the disclosure.

In further embodiments, a display unit 10a is provided in addition to the actuator 10. The display unit 10a is provided, for example, to display intervention of the driving dynamics controller 60 and/or to output a warning that the driving dynamics controller 60 will immediately intervene.

The driving dynamics controller 60 is provided by a parameterized function $a = f(s, \theta)$ which outputs the actuation signal A depending on the state s and/or on the sensor signals S of the sensor 30. In the event that the driving dynamics controller 60 outputs an actuation signal A for the actuator 10, where the actuator 10 has a plurality of actuators, the actuation signal A can have a respective control signal for each of the actuators. The individual actuators may be the individual brakes of the vehicle 100.

In a preferred exemplary embodiment, the driving dynamics controller 60 is an ABS controller, where this controller outputs a brake force or a brake pressure as actuation signal. In this case, the driving dynamics controller 60 preferably outputs a brake pressure or brake force for each of the brakes of the wheels or for each of the axles of the vehicle 100 in order to be able to control the wheels individually.

The driving dynamics controller 60 preferably has a controller structure which is able to be interpreted. This can be provided, for example, by virtue of valid parameter limits within the controller being able to be defined. This has the advantage that the behavior of the driving dynamics controller 60 is able to be understood in each situation.

Examples of the parameterized function $f$ of the driving dynamics controller 60 are as follows:

A driving dynamics controller 60, which has a controller structure which is able to be interpreted, may be provided, for example, by a structured driving dynamics controller 60 that is structured like a decision tree.

In order to ascertain an action based on the decision tree, a root node along the tree is taken as starting point. For each node, an attribute is retrieved (for example a vehicle state) and a decision is made about the selection of the following nodes by means thereof. This procedure is continued until a leaf of the decision tree is reached. The leaf characterizes one action of a plurality of possible actions. The leaf may characterize a brake pressure build-up/reduction, for example.

In this example, the parameters θ are decision threshold values or the like.

The driving dynamics controller 60 may alternatively be provided by an RBF (radial basis function) network or by a deep RNN policy.

It should be noted that the parameterized function $f$ may also be any other mathematical function that maps the state of the vehicle onto an actuation signal depending on the parameters.

Figure 2:
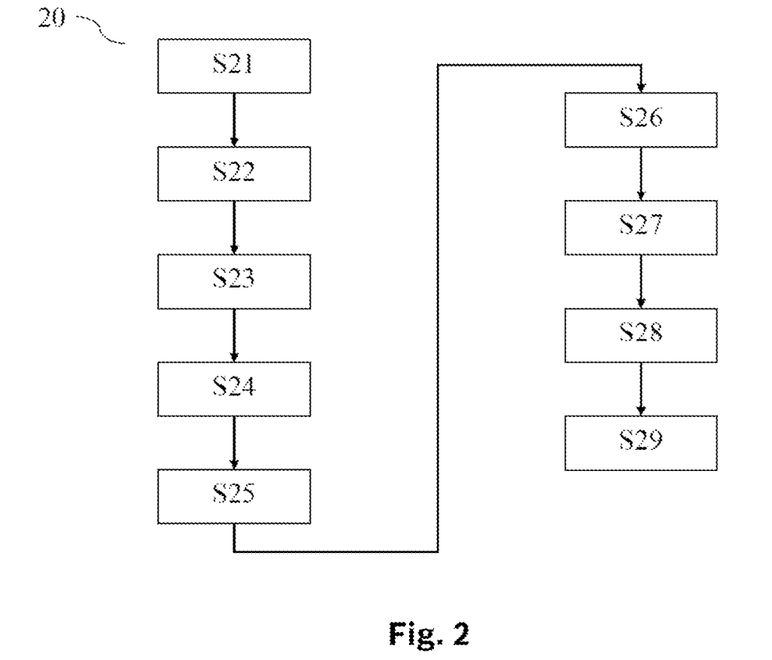
FIG. 2 schematically shows a flowchart of a method for parameterizing the driving dynamics controller.

FIG. 2 shows a schematic illustration of a flowchart 20 for parameterizing the vehicle dynamics controller 60 and optionally subsequent operation of the driving dynamics controller 60 in the vehicle 100.

The method begins with step S21. In this step, driving data of the vehicle 100 are collected. The driving data are, for example, a series of data $s_0, s_1, \ldots, s_t, \ldots, s_T$ that describe a state s of the vehicle 100 along a driving maneuver. Said driving data are preferably a data tuple, comprising the state data $s_t$ and action data $a_t$ at each time t of the maneuver.

In the event that the driving dynamics controller 60 is an ABS controller, a brake process can be recorded, for example, using a known ABS controller or by a driver driving the vehicle 100, wherein the state data ($s_t$) comprise for example the following sensor data: vehicle speed $v_{veh}$, acceleration $a_{veh}$, preferably subsequent sensor data per wheel of the vehicle 100: wheel speed $v_{wheel}$, acceleration $a_{wheel}$, jerk $j_{wheel}$. The action data ($a_t$) are the brake forces selected in the respective state, preferably also a variable that characterizes a road surface.

As an alternative, the driving data can be generated by simulation, in which a fictitious vehicle executes one or a plurality of (brake) maneuvers in a simulated environment.

Step S22 can subsequently follow. In said step, the recorded state data s are partly reconstructed. This is because not all of the required information about the state of a system (car) are typically measured by internal sensors (for example inclination of the vehicle, suspension behavior, wheel acceleration). This latent information has to be retrieved for the learning and the modeling in order to enable predictions and optimizations. This area is typically referred to as latent state inference (for example hidden Markov models) and resolved by filter/smoothing algorithms (for example Kalman filters). The vehicle states are preferably reconstructed in step S22 by means of the Kalman filter.

After step S21 or step S22 have ended, step S23 follows. In this step, a model P is provided. This can be provided either by the model P being created based on the recordings according to step S21 or a physical model is provided.

The model $P(s_{t+1}|s_t, a_t)$ is a model that predicts a subsequent vehicle state $s_{t+1}$ at an immediately following time t+1 depending on a vehicle state $s_t$ at a time t and an actuation signal selected depending thereon.

The model $P(s_{t+1}|s_t, a_t)$ is preferably a physical model of the first order. That is to say the physical model comprises equations which describe physical relationships and predict the subsequent vehicle state $s_{t+1}$, in particular in a deterministic manner, depending on the current vehicle state $s_t$ and the action $a_t$. By way of example, for the driving dynamics controller 60 for ABS, the physical model may be made up of one or a plurality of submodels from the following list of submodels: a first submodel which is a physical model of a wheel of the vehicle 100, a second submodel which describes the center of mass of the vehicle, a third submodel which is a physical model of the damper, a fourth submodel which is a physical model of the tire and a fifth submodel which is a multidimensional model of a hydraulic model. It should be noted that the list is not exhaustive and other physical features such as tire/brake temperature etc. can be taken into account.

It should be noted that, in addition to the model P, other approaches are also conceivable for optimizing the parameterization. As an alternative to the model, what is known as a model-free reinforcement learning approach or a value-based reinforcement learning approach can also be selected. Accordingly, in step S23, for example, the Q function for value-based reinforcement learning is then created based on the recordings from step S21.

Step S24 may follow step S23. Step S24 may be referred to as "on-policy correction". In this case, a correction model g is produced which corrects predictions of the model $P(s_{t+1}|s_t, a_t)$ by means of vehicle states in such a way that the corrected predictions are substantially covered by the detected predictions from step S21.

The corrected vehicle state is preferably corrected as follows:

$$s_{t+1}' = P(s_{t+1}|s_t, a_t) + g(s_t, a_t)$$

The correction model g is created so that it is optimized to the effect that it, given $s_t$ and $a_t$, outputs a value that corresponds to the error of the model $P(s_{t+1}|s_t, a_t)$ in relation to the detected vehicle states according to S21.

Furthermore, the correction model g has the advantage that it corrects a lack of conformity of the model P compared with the actual behavior of the vehicle.

In order to be able to correct the lack of conformity of the model P compared with the actual behavior of the vehicle, the following measures can be taken as an alternative or in addition. It is conceivable that what is known as transfer learning is used for this, which involves previously ascertained vehicle states and thus permits more rapid learning of the model for the specific vehicle instance. It is also conceivable that a plurality of different models are used, as a result of which a more robust controller behavior can be learned through this group.

Step S25 follows step S23 or step S24. In said step, a plurality of rollouts are executed. That is to say the driving dynamics controller is applied for a maneuver and the resulting trajectory, in particular ascertained sequences of vehicle states, is detected using the current parameterization $\theta_k$ of the driving dynamics controller 60 and using the model P, in particular additionally using the correction model g.

It should be noted that, in addition to the model P, other approaches are also conceivable for optimizing the parameterization (model-free reinforcement learning approach or value-based reinforcement learning approach). Accordingly, in this rollout step, the detection of the trajectory has to be adjusted.

Step S26 follows after step S25 has been executed or after step S25 has been executed repeatedly several times. In this step, costs for the detected trajectory/trajectories from step S25 are evaluated.

The costs for the trajectory can be ascertained as follows. Costs are preferably ascertained for each proposed action of the driving dynamics controller 60. For this purpose, a cost function c(s, a) can ascertain the costs depending on the previous trajectory or the current vehicle state $s_t$ and the currently selected action $a_t$. The total cost for a trajectory can then be accumulated over the entire maneuver, that is to say over all times t:

$$J(\theta) = \sum_{t=0}^{T} c(s_t, f(s_t, \theta))$$

The cost function c(s, a) can be made up as follows:

$$c(s,a) = \alpha_1 * \text{mean deceleration} + \alpha_2 * \text{steerability} + \alpha_3 * \ldots$$

where $\alpha_n$ are predeterminable coefficients that are predetermined, for example, by an application engineer or are set to initial values. These coefficients may assume a value between 0 and 1.

steerability can be understood to mean a controllability of the vehicle. Said controllability can be ascertained (for example F_lat, max−F_lat, current) depending on a force (F_lat) that acts laterally on the vehicle, possibly also depending on a normalized lateral force:

(F_lat,max−F_lat,current)/F_lat,max,non_braking).

The controllability can also be defined negatively if the cost function is intended to be minimized. In addition or as an alternative, the controllability can also be ascertained depending on longitudinal forces, such that the longitudinal forces are not fully utilized in order to allow "leeway" for lateral forces. For this purpose, a target slip range can be defined (for example slip∈ [slip_min, slip_max]) in order to map onto corresponding costs using a sigmoid function, for example.

mean deceleration can be understood to mean an averaging over all accelerations of the trajectory, for example $$\frac{1}{n}\sum_i a_i \forall i$$

in $ABS_{active}$.

Further components of the cost function can be given by any behavior of the vehicle that is intended to be penalized or rewarded. By way of example, this may be: comfort/jerk, that is to say how juddery the braking is, or hardware requirements (how encumbering the braking is for brake system, vehicle, hydraulics, tires, performance (for example braking distance, acceleration), directional stability, that is to say a behavior about the vertical axis.

All of these components can be evaluated based on different signals (sensor signals or estimations) and based on different cost functions, for example mean absolute error, mean squared error, root mean squared error between actual and target state (for example in slip, friction value, jerk), or standard deviation of a signal.

Another component of the cost function may be an overall braking distance. This may be a single value that is obtainable only in the temporal step in which the braking is ended (for example $v_{veh} < v_{threshold} \rightarrow c$, wherein c is the overall braking distance) or a sum over v*dt for each temporal step in which the braking is active.

Another component of the cost function may be a deviation of a slip with respect to a target slip: $\|slip-lip\_target\|^2$ and/or an average acceleration: mean std(acceleration).

Step S27 follows after the total costs for the trajectory or the plurality of trajectories have been ascertained in step S26. In this step, the parameters θ of the driving dynamics controller 60 are adjusted iteratively in such a way that they reduce the overall costs. In this case, optimization may be defined as follows:

$$\theta^* = \mathrm{argmin}_\theta J(\theta)$$

This optimization by means of the parameters θ can be carried out by means of a gradient descent method by means of the overall costs J.

The current parameters $\theta_k$ are then adapted as follows per iteration k of the optimization:

$$\theta_{k+1} = \theta_k + \lambda \frac{dJ}{d\theta}$$

wherein λ is a coefficient that assumes a value less than 1.

The iteration can be executed until a stop criterion is satisfied. Stop criteria could be, for example; a number of maximum iterations, a minimum change in $J < J_{threshold}$, a minimum change in the parameters $\theta < \theta_{threshold}$.

In the event that a plurality of overall costs have been ascertained, in particular for different maneuvers, the parameters can be adjusted in batches over the plurality of overall costs. The batch-wise procedure can be carried out as a batch over model parameters, as a batch over scenarios/maneuvers or as a batch over subtrajectories.

After step S27 has been terminated, steps S25 to S27 can be executed again; as an alternative, steps S21 to S27 can also be executed again.

In the optional step S28, the control system 40 of the vehicle 100 is initialized using the adjusted vehicle dynamics controller 60 from step S27.

In the subsequent optional step S29, the vehicle 100 is operated using the adjusted vehicle dynamics controller 60. In this case, the vehicle 100 can be controlled by said vehicle dynamics controller 60 when it is activated in a corresponding situation, for example when an emergency brake is carried out.

In another embodiment of the method according to FIG. 2, after step S27 has been terminated, steps S21 to S27 can also be executed again, but the adjusted vehicle dynamics controller 30 according to step S27 is performed on a further vehicle of another vehicle model or type and new measurements are carried out according to step S21. This makes it possible to reoptimize an optimized driving dynamics controller 60 for another vehicle with little outlay.

In another embodiment of the method according to FIG. 2, a plurality of different models P are provided or produced and trajectories are produced for each of the models. These models differ in that they describe different scenarios and/or take into account different dynamics of external variables, for example road surface or other driving properties of other vehicle model types or wear of the tires/other components of the vehicle. This has the advantage that the driving dynamics controller learns how to deal with changes over time.

Figure 3:
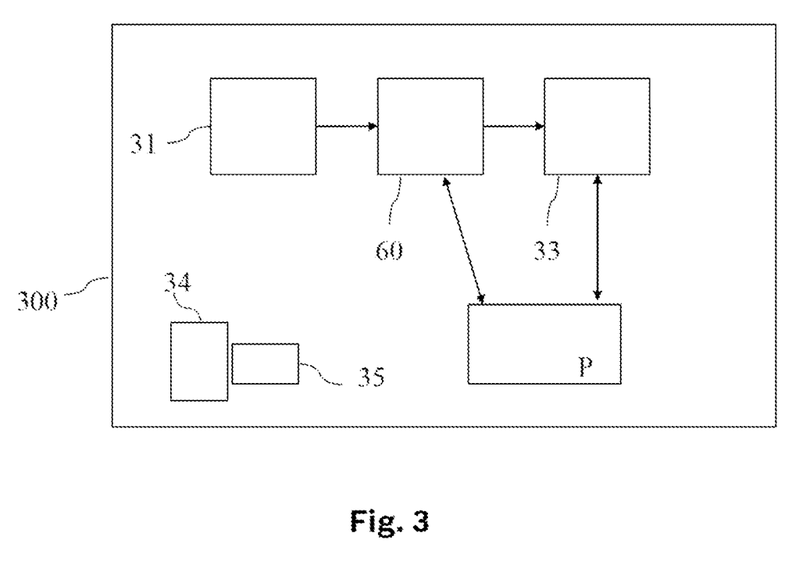
FIG. 3 shows a possible design of a training device.

FIG. 3 schematically shows a training device 300 for parameterizing the driving dynamics controller 60. The training device 300 comprises a provider 31 which provides either the recorded driving data from step S21 or is a simulated environment which produces a state according to the executed actions of the driving dynamics controller 60. The data of the provider 31 are passed onto the driving dynamics controller 60 which ascertains the respective action therefrom. The data of the provider 31 and the actions are supplied to an evaluator 33 which ascertains parameters adjusted according to step S27 therefrom, the parameters being transmitted to the parameter memory P and replacing the current parameters there.

The steps executed by the training device 300 can be stored as a computer program implemented on a machine-readable storage medium 34 and can be executed by a processor 35.

The term "computer" includes any devices for processing predefinable calculation specifications. These calculation specifications may be present in the form of software or in the form of hardware or else in a mixed form of software and hardware.

What is claimed is:

1. A method for parameterizing a driving dynamics controller of a vehicle for intervening in a controlling manner in a driving dynamics of the vehicle, comprising:
    ascertaining, using the driving dynamics controller, an action depending on a vehicle state of the vehicle;
    predicting a subsequent vehicle state of the vehicle depending on the ascertained vehicle state and the ascertained action using a model;
    ascertaining at least one data tuple comprising a sequence of the vehicle states and respectively associated actions, wherein the vehicle states are ascertained by the driving dynamics controller using the model and depend on corresponding ascertained actions; and
    adjusting parameters of the driving dynamics controller such that a cost function is minimized,
    wherein the cost function ascertains costs of the data tuple depending on the vehicle states of the data tuple and on the ascertained actions of the respectively associated vehicle states, and
    wherein the cost function is dependent on the parameters of the driving dynamics controller.

2. The method according to claim 1, wherein the model is a machine learning system, a parameterization of which has been learned depending on detected driving maneuvers of the vehicle or another vehicle.

3. The method according to claim 1, further comprising:
    detecting a trajectory of a real driving maneuver of the vehicle; and
    creating a correction model depending on the detected trajectory and the model, such that the correction model corrects outputs of the model in such a way that the corrected outputs substantially correspond to the detected trajectory.

4. The method according to claim 3, wherein the model is deterministic and the correction model is dependent on time.

5. The method according to claim 1, wherein:
a plurality of different models are provided, and
the data tuple is detected randomly for one model of the plurality of different models.

6. The method according to claim 5, wherein the different models differ from one another in that they each describe different dynamics of external variables or different dynamics of variables of the vehicle.

7. The method according to claim 5, wherein:
a respective data tuple is detected for each of the models, and
the parameters are changed depending on all of the data tuples.

8. The method according to claim 1, further comprising: filtering the vehicle states using a Kalman filter.

9. The method according to claim 1, wherein:
the driving dynamics controller has a modular controller structure, and
the parameters are adjusted in such a way that the adjusted parameters are within predefined value ranges.

10. The method according to claim 1, wherein the driving dynamics controller is a radial basis function network.

11. The method according to claim 1, wherein:
after the parameters have been adjusted, a vehicle state is detected during operation of the vehicle, and
an actuator of the vehicle is actuated depending on the action using the driving dynamics controller depending on the detected vehicle state.

12. The method according to claim 2, wherein:
the driving dynamics controller includes an antilock braking system (ABS) controller and outputs an action which characterizes a braking force,
the physical model comprises a plurality of submodels, and
the submodels are each a physical model of a component of the vehicle.

13. The method according to claim 1, wherein:
the cost function is a weighted superposition of a plurality of functions, and
the functions characterize a difference between a current slip of tires of the vehicle and a target slip, a distance covered since intervention of the driving dynamics controller, and temporal deviations in the distance covered.

14. The method according to claim 1, wherein a device is configured to execute the method.

15. The method according to claim 1, wherein a computer program comprises instructions that, when the computer program is executed by a computer, cause the computer to execute the method.

16. The method according to claim 15, wherein the computer program is stored on a non-transitory machine-readable storage medium.

17. The method according to claim 1, wherein the model is a physical model configured to describe driving dynamics of the vehicle along a longitudinal, lateral, and horizontal axis of vehicle.

* * * * *